(12) United States Patent
Fair

(10) Patent No.: US 7,140,195 B1
(45) Date of Patent: Nov. 28, 2006

(54) HEAT TRANSFER APPARATUS

(76) Inventor: Shields Fair, 2010 E. University #24, Tempe, AZ (US) 85281

( * ) Notice: Subject to any disclaimer, the term of this patent is extended or adjusted under 35 U.S.C. 154(b) by 0 days.

(21) Appl. No.: 11/250,998

(22) Filed: Oct. 14, 2005

(51) Int. Cl.
 *F28D 5/00* (2006.01)
(52) U.S. Cl. .......................... 62/310; 62/314; 261/151
(58) Field of Classification Search .................. 62/304, 62/305, 310, 314, 259.4; 261/78.1, 138, 261/151, 158, 160
See application file for complete search history.

(56) References Cited

U.S. PATENT DOCUMENTS

| | | | | |
|---|---|---|---|---|
| 4,616,783 A | * | 10/1986 | Weber et al. ............... | 239/216 |
| 5,606,868 A | * | 3/1997 | Calvert ..................... | 62/315 |
| 5,724,828 A | * | 3/1998 | Korenic .................... | 62/305 |
| 6,018,954 A | * | 2/2000 | Assaf ....................... | 62/94 |
| 6,188,045 B1 | * | 2/2001 | Hansen et al. ............ | 219/401 |
| 6,212,897 B1 | * | 4/2001 | Wang ....................... | 62/314 |
| 6,385,987 B1 | * | 5/2002 | Schlom et al. ............ | 62/304 |
| 6,408,633 B1 | * | 6/2002 | Carr ........................ | 62/99 |
| 6,494,053 B1 | * | 12/2002 | Forkosh et al. ............ | 62/271 |
| 6,598,414 B1 | * | 7/2003 | Cline ....................... | 62/314 |
| 6,640,575 B1 | * | 11/2003 | Word ....................... | 62/314 |
| 6,797,045 B1 | * | 9/2004 | Okuda et al. ............. | 96/282 |
| 6,817,206 B1 | * | 11/2004 | Shahbaz ................... | 62/331 |

FOREIGN PATENT DOCUMENTS

JP      8-144169 A   *   6/1996

\* cited by examiner

*Primary Examiner*—Mohammad M. Ali
(74) *Attorney, Agent, or Firm*—Parsons & Goltry; Michael W. Goltry; Robert A. Parsons

(57) ABSTRACT

A heat transfer apparatus includes a wetting chamber, an air intake opening leading to an air flow pathway through the wetting chamber, an air outtake opening leading from the air flow pathway through the wetting chamber, an atomizer, a liquid reservoir, and a liquid delivery system for moving liquid from the liquid reservoir to the atomizer. The atomizer is arranged to receive the liquid from the liquid delivery system and disperse the liquid into the air flow pathway in a form of atomized liquid, and the liquid reservoir is disposed to collect the atomized liquid from the wetting chamber.

26 Claims, 12 Drawing Sheets

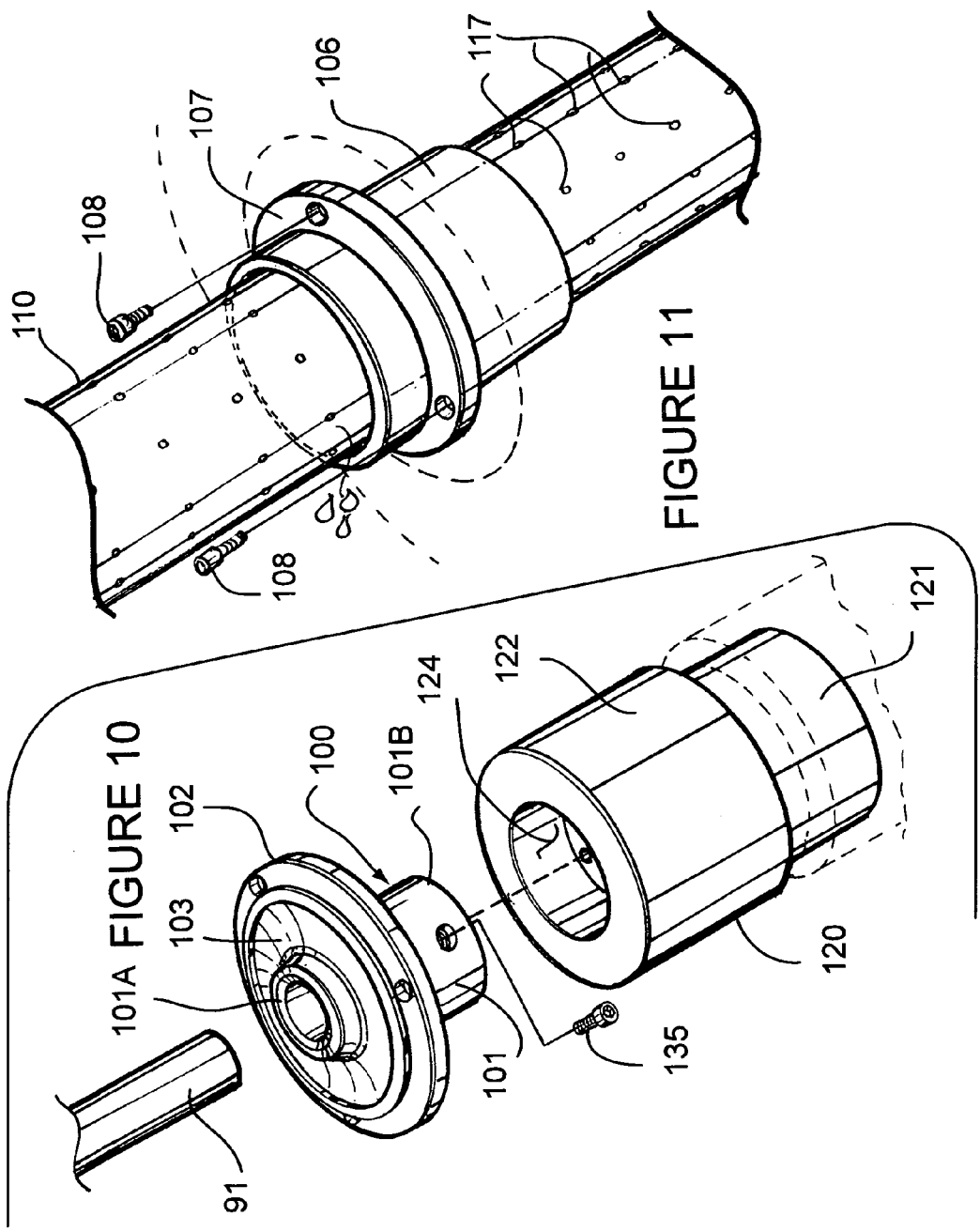

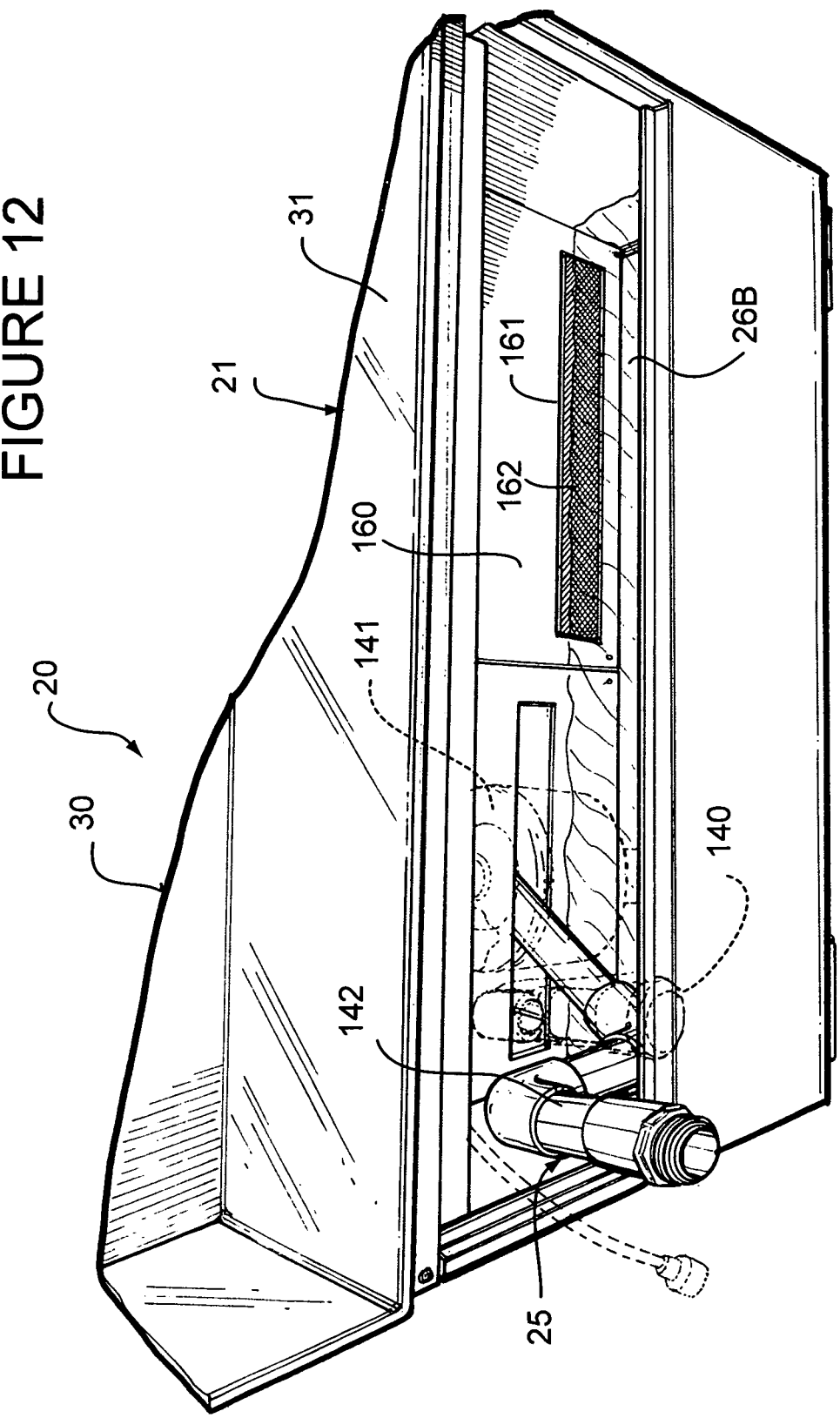

HEAT TRANSFER APPARATUS

FIELD OF THE INVENTION

The present invention relates to heat exchange systems and methods and, more particularly, cold liquid generators and to heat transfer apparatus for providing conditioning air to habitable structures.

BACKGROUND OF THE INVENTION

Typically, cooling systems, such as those used for cooling habitable structures, consist of systems that cool the air. The cooling of the air is performed in many ways, such as using cooled refrigerant, cooled air or cooled water. Evaporative cooling systems have historically been less expensive than refrigerant systems. Evaporative systems that utilize the evaporation of water, such as those that use pads soaked with water and have air drawn through them, have been used for many years. Such evaporation systems, however, tend to humidify the air within the structure, causing reduced occupant comfort after a certain dew point is reached.

The use of cooled water systems, such as those using cooling towers, is well-known in large-scale commercial applications. The residential use of circulating cooled water to cool the air within a structure has not been well received, due to set-up and operating costs. Additionally, the perceived negative aesthetics of most traditional cooled water systems has limited the broader adoption of use in residential applications. A cooling system that would economically and efficiently cool the air within a structure, using cooled liquid (water) to transfer heat from the structure's air as a means to cool the air and not add humidity to the air, would be advantageous.

SUMMARY OF THE INVENTION

It is an object of the invention to provide a heat transfer apparatus with an atomizer for creating and distributing atomized liquid into an air flow pathway, a liquid reservoir for collecting the atomized liquid from the air flow pathway and a liquid delivery system for circulating the liquid from the liquid reservoir between conditioning air heat exchanger on the one hand and the atomizer on the other hand, which is simple in structure, which low in cost, which is safe, which incorporates a precooler for precooling air to the air flow pathway, which is easy to construct, which is easy to install, which is easily and inexpensively maintained, which is scalable in size, which is designed for continual operation, and which is quiet.

According to the invention, a heat transfer apparatus is provided including a wetting chamber, an air intake opening leading to an air flow pathway through the wetting chamber, an air outtake opening leading from the air flow pathway through the wetting chamber, an atomizer, a liquid reservoir, and a liquid delivery system for moving liquid from the liquid reservoir to the atomizer. The atomizer is arranged to receive the liquid from the liquid delivery system and disperse the liquid into the air flow pathway in a form of atomized liquid. The liquid reservoir is disposed to collect the atomized liquid from the wetting chamber. Further to the present embodiment is a first heat exchanger disposed at the intake opening, a second heat exchanger disposed at the outtake opening, and a liquid circulation system for circulating liquid between the first and second heat exchangers. Blower apparatus is provided for forcing air through the air flow pathway from the intake opening to the outtake opening.

A conditioning air heat exchanger is disposed in a conditioning air flow pathway between a conditioning air intake opening leading from a habitable structure and a conditioning air outtake opening leading to the habitable structure, and is coupled to the liquid delivery system between the liquid reservoir and the atomizer. A conditioning air blower apparatus is provided, which forces conditioning air through the conditioning air flow pathway from the conditioning air intake opening to the conditioning air outtake opening.

According to the invention, the atomizer consists of an impeller, which is disposed in the wetting chamber, which is mounted for rotation, and which is arranged to receive liquid from the liquid delivery system. The invention incorporates a drive mechanism for imparting rotation to the impeller, whereby rotation of the impeller produces the atomized liquid from the liquid received by the impeller from the liquid delivery system, and disperses the atomized liquid into the air flow pathway. In one embodiment, the drive mechanism includes at least one stream of liquid directed at the impeller from the liquid delivery system. In another embodiment, the drive mechanism includes a motor coupled to the impeller.

The impeller includes an elongate body having a proximal end, a distal end, and a plurality of radial vanes attached to and extending between the opposing proximal and distal ends encircling an interior space of the impeller. The liquid delivery system incorporates an elongate foraminous conduit, which is disposed in the interior space, and is adapted and arranged to dispersing liquid to the radial vanes of the impeller from the interior space thereof. Preferably, the impeller is further mounted for rotation relative to the elongate foraminous conduit. A collar is attached to the distal end of the impeller and encircles the elongate foraminous conduit, in which elongate foraminous conduit is arranged to introduce liquid therefrom between the collar and the elongate foraminous conduit lubricating the collar relative to the elongate foraminous conduit. A coupling, which is mounted for rotation, is attached to the proximal end of the impeller, and the elongate foraminous conduit is arranged to introduce liquid therefrom between the coupling and the elongate foraminous conduit lubricating the coupling relative to the elongate foraminous conduit.

According to the principle of the invention, a heat transfer system is provided including an air flow pathway, an artificially-produced air stream passing through the air flow pathway, a rotating impeller disposed adjacent the air flow pathway, a liquid delivery system delivering liquid from a source of liquid to the rotating impeller thereby producing atomized liquid and dispersing the atomized liquid into the artificially-produced air stream, and a liquid reservoir collecting the atomized liquid. A first heat exchanger is in the air stream upstream of the rotating impeller, a second heat exchanger is in the air stream downstream of the rotating impeller, and a liquid circulation system circulates liquid between the first and second heat exchangers. Also provided is at least one blower producing the air stream through the air flow pathway. In a particular embodiment, the liquid reservoir constitutes a source of liquid for the liquid delivery system, and a conditioning air heat exchanger, which is disposed in a conditioning air flow pathway between a conditioning air intake opening and a conditioning air outtake opening, is coupled to the liquid delivery system between the liquid reservoir and the rotating impeller. There is also at least one conditioning air blower forcing conditioning air through the conditioning air flow pathway from the conditioning air intake opening to the conditioning air outtake opening. Preferably, the impeller consists of an elongate body having a proximal end, a distal end, and a plurality of radial vanes attached to and extending between the opposing proximal and distal ends encircling an interior space of the impeller, and the liquid delivery system includes an elongate foraminous conduit disposed in the interior space of the impeller dispersing liquid to the radial vanes of the impeller from the interior space thereof.

Consistent with the foregoing summary of the invention, and the ensuing detailed description, which are to be taken together, the invention also contemplates associated apparatus and method embodiments.

BRIEF DESCRIPTION OF THE DRAWINGS

Referring to the drawings:

FIG. 10 is an exploded perspective view of an attachment coupling of the driven end of the impeller assembly as shown in FIG. 9;

FIG. 11 is a fragmented perspective view of an elongate foraminous conduit of the impeller assembly of FIG. 9, which is encircled by an attachment collar;

FIG. 12 is a fragmented perspective view of the cold liquid generator of FIG. 4 illustrating an auxiliary reservoir region of the liquid reservoir;

DETAILED DESCRIPTION OF PREFERRED EMBODIMENTS

Figure 1:
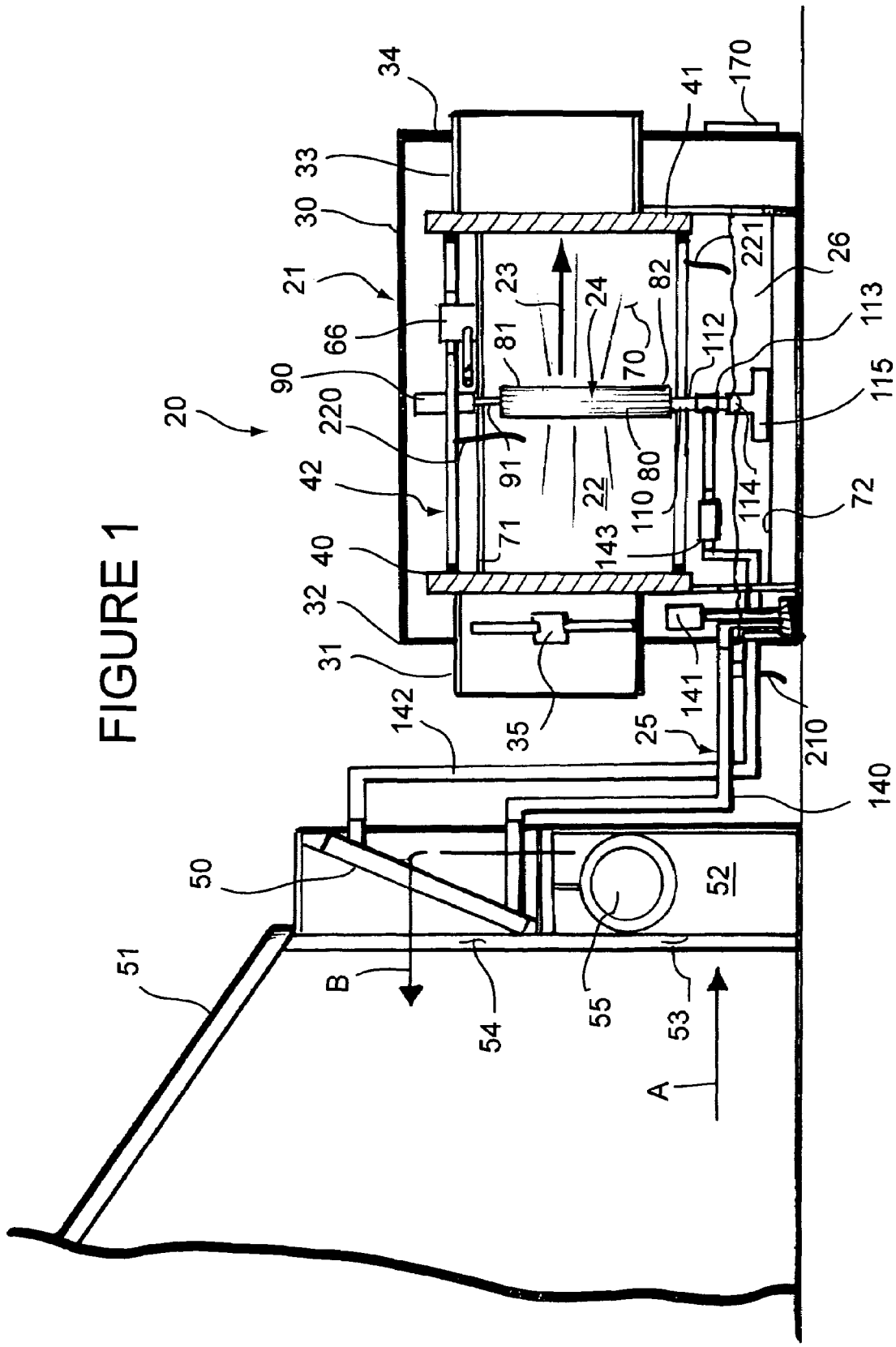
FIG. 1 is a diagrammatic view of a heat transfer apparatus constructed and arranged in accordance with the principle of the invention.
Figure 3:
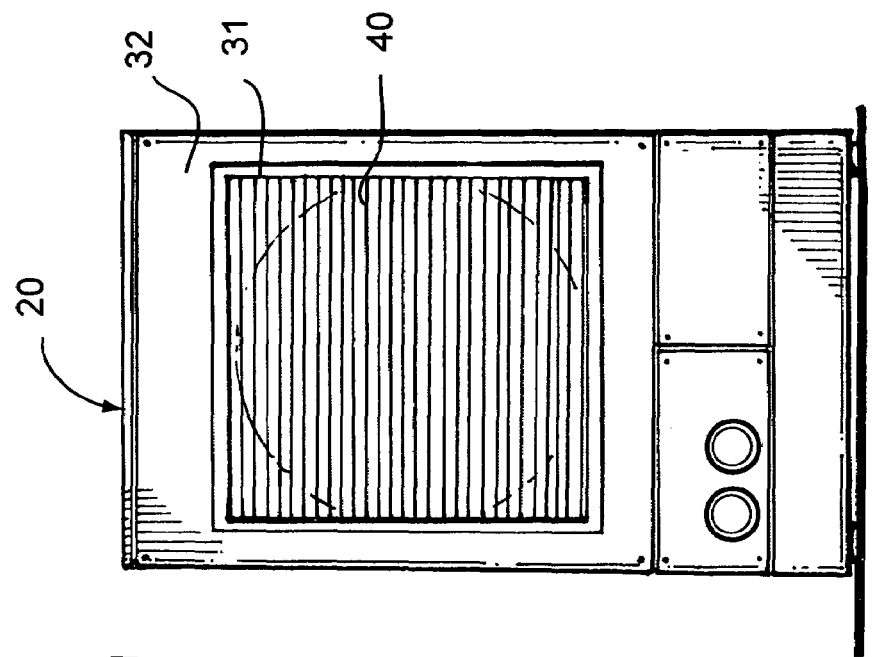
FIG. 3 is an end elevational view of the cold liquid generator of FIG. 2.

Turning now to the drawings, in which like reference characters indicate corresponding elements throughout the several views, attention is first directed to FIG. 1 in which there is seen a heat transfer apparatus 20 incorporating a cold liquid generator 21, which generates cold liquid that is delivered to a conditioning air heat exchanger 50 for cooling the inside air of a habitable structure 51. In general, generator 21 includes an air flow pathway 22, an artificially-produced air stream 23 passing along an air flow pathway 22 through a wetting chamber 70, a rotating impeller 24 disposed adjacent air flow pathway 22, a liquid delivery/transfer system 25 delivering liquid from a source of liquid to rotating impeller 24 thereby producing atomized liquid and dispersing the atomized liquid into air stream 23, and a liquid basin, sump, or reservoir 26 collecting the atomized liquid produced by rotating impeller 24. In this embodiment, liquid reservoir 26 constitutes the source of liquid for liquid delivery system 25. Liquid reservoir 26 will typically maintain approximately 60 gallons of liquid, such as water, and it can be configured to hold less or more depending on specific needs.

Figure 4:
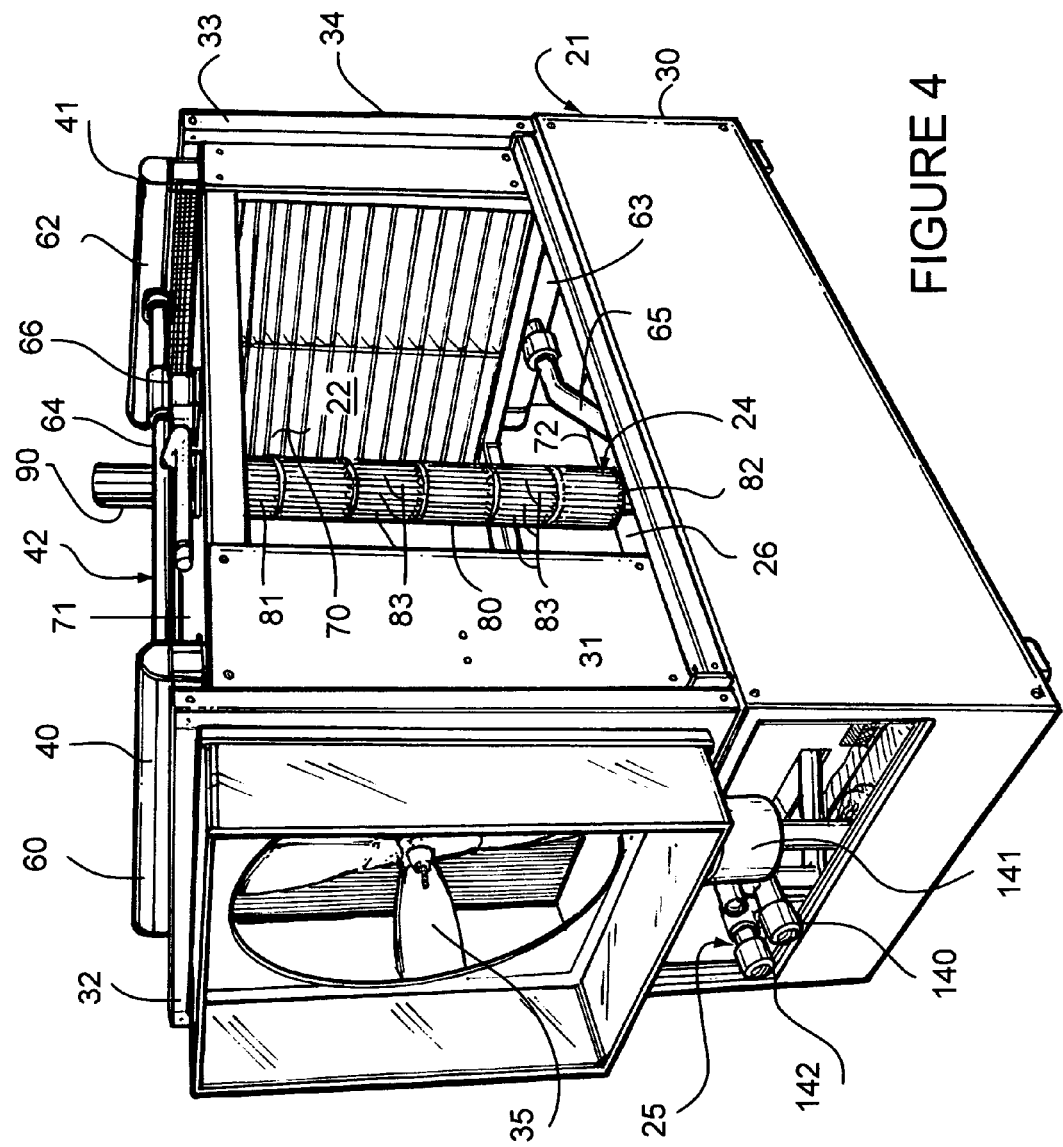
FIG. 4 is a perspective view of the cold liquid generator of FIG. 2 shown as it would appear with portions of the housing thereof removed illustrating a wetting chamber and an impeller assembly disposed therein.

With additional reference to FIG. 4, generator 21 incorporates a housing 30, which bounds and defines wetting chamber 70 which in turn bounds and defines air flow pathway 22 therethrough, and that also defines an air intake opening or inlet 31 at an upstream end 32 of housing 30 leading to air flow pathway 22 and an air outtake opening or outlet 33 at an opposing downstream end 34 of housing 30 leading from air flow pathway 22. Regarding FIG. 1, air stream 23 passes through air flow pathway 22 from inlet 31 to outlet 33. Air passing inwardly through inlet 31 into air flow pathway 22 is intake air and air passing outwardly through outlet 33 from air flow pathway 22 is outtake or exhaust air.

Air stream 23 is artificially-produced and passes through air flow pathway 22 bound by housing 30 from inlet 31 to outlet 33, and in this embodiment is produced by a fan or blower 35 mounted to housing 30 at inlet 31, which when activated forcibly blows air into air flow pathway 22 through inlet 31 producing air stream 23 therethrough. In this case, blower 35 pushes air into air flow pathway 22 through inlet 31. If desired, blower 35 can be mounted to housing 30 at outlet 33, which when activated will forcibly pull air into air flow pathway through inlet 31. Although one blower is shown for producing air stream 23, two or more can be used, if desired, including one at inlet 31 and another at outlet 33. It is to be understood that air stream 23 extends from inlet 31 to outlet 33, as does air flow pathway 22. Blower 35 is a conventional and well-known blower apparatus, and is preferably configured to deliver 3100 cfm at full speed. Blower 35 is preferably adjustable between a flow rate range of 800–3100 cfm.

A heat exchanger 40 is positioned in air stream 23 upstream of impeller 24, and another heat exchanger 41 is positioned in air stream 23 downstream of impeller 24. Heat exchanger 40 is mounted to housing 30 adjacent inlet 31, and heat exchanger 41 is mounted to housing 30 adjacent 33, in which heat exchanger 40 is disposed at the upstream side of air stream 23 and heat exchanger 41 is disposed at the downstream side of air stream 23. A liquid circulation system 42 circulates liquid between heat exchangers 40 and 41. Air passing through air flow pathway 22 from inlet 31 blows over heat exchanger 40, and air passing through air flow pathway 22 from outlet 33 blows over heat exchanger 40. Heat exchangers 40 and 41 are conventional radiators, such as the type commonly found in conjunction with motorized vehicles, the details of which will readily occur to those skilled in the art.

Also part of heat transfer apparatus 20 is a conditioning air heat exchanger 50, which is disposed apart from generator 21, and which is coupled in fluid communication with liquid delivery system 25 between liquid reservoir 26 and impeller 24. Conditioning air heat exchanger 50 is associated with a habitable structure 51, and is disposed in a conditioning air flow pathway 52 of habitable structure 51 between a conditioning air intake opening 53 and a conditioning air outtake opening 54. A conditioning air blower 55 forces conditioning air through conditioning air flow pathway 52 and over conditioning air heat exchanger 50 drawing intake air into conditioning air flow pathway 52 from the interior of habitable structure 51 through intake opening 53 in the direction indicated by the arrowed line A and forcing outtake air from conditioning air flow pathway 52 into the interior of habitable structure 51 through outtake opening 54 in the direction indicated by the arrowed line B. Blower 55 is a conventional and well-known blower apparatus of the type commonly found in conjunction with air conditioning systems.

In operation, blower 35 is activated producing air stream 23 through air flow pathway 22 from inlet 31 to outlet, liquid delivery system 25 is activated moving liquid from liquid reservoir 26 to conditioning air heat exchanger 50 and from there to impeller 24, in which impeller 24 is rotating creating atomized liquid and dispersing the atomized liquid into air stream 23, and liquid circulation system 42 is activated circulating liquid contained therein to and between heat exchangers 40 and 41. Air entering inlet 31 is ambient air. Prior to entering air flow pathway 22 within the interior of housing 30, the ambient air from inlet 31 blows over heat exchanger 40 and is cooled, in which heat exchanger 40 functions as a precooler for air stream 23 entering housing whereby heat from the ambient air is transferred to, or otherwise picked up by, the liquid passing through heat exchanger 40.

After blowing over heat exchanger 40, the air forming air stream 23 passes through air flow pathway 22 and through the atomized liquid dispersed therein. The temperature of the atomized liquid broadcast in air flow pathway 22 is colder than the temperature of the air forming air stream 23 when it enters air flow pathway 22 after being precooled by heat exchanger 40 upstream of impeller 24. The cold nature of the atomized liquid is caused by the atomization of the liquid by rotating impeller 24, which causes the rapid evaporation and subsequent condensation of the liquid at air flow pathway 22. Accordingly, when the precooled air from heat exchanger 40 forming air stream 23 interacts with the atomized liquid formed by impeller 24, a heat transfer event takes place between air stream 23 and the atomized liquid which cools the air in air stream 23 before it passes outwardly through outlet 33 as exhaust air. In this regard the temperature of the air of air stream 23 between inlet 31 and impeller 24 is greater than the temperature of the air of air stream 23 between impeller 24 and outlet 33. The ongoing cycle between evaporation of the atomized liquid and its condensation provides an aggressive cooling of the condensate liquid, which is collected in liquid reservoir 26.

Due to the heat picked up by liquid at heat exchanger 40, the temperature of the liquid transferred to heat exchanger 41 from heat exchanger 40 via liquid circulation system 42 is greater than the temperature of the exhaust air passing therethrough from air flow pathway 22. Prior to exiting air flow pathway 22 from the interior of housing 30, the air of air stream 23 from in the interior of housing 30 blows over heat exchanger 41 and is heated, in which heat exchanger 41 functions as a heater for air of air stream 23 exiting housing 30 whereby heat from the liquid passing through heat exchanger 41 is transferred to, or otherwise picked up by, the liquid passing through heat exchanger 41. Still, the temperature of the liquid transferred to heat exchanger 40 from heat exchanger 41 via liquid circulation system 42 is less than the temperature of the ambient air passing into housing 30 through inlet 31.

Cold water collected in liquid reservoir 26 is transferred by liquid delivery system 25 to conditioning air heat exchanger 50. When conditioning air blower 55 is activated, it forces air through conditioning air flow pathway 52 and over conditioning air heat exchanger 50 drawing intake air into conditioning air flow pathway 52 from the interior of habitable structure 51 through intake opening 53 and forcing outtake air from conditioning air flow pathway 52 into the interior of habitable structure 51 through outtake opening 54. When the conditioning air blows over conditioning air heat exchanger 50 disposed in the conditioning air flow pathway 52 between intake opening 53 and outtake opening 54, the air is cooled, in which conditioning air heat exchanger 50 functions as a cooler for the air passing through conditioning air flow pathway 52, whereby heat from the air of the conditioning air flow pathway 52 is transferred to, or otherwise picked up by, the cold liquid from liquid reservoir 26 passing through conditioning air heat exchanger 50. After exiting conditioning air heat exchanger 50, the liquid is transferred back to impeller via liquid delivery system 25 and the heat exchange process provided by heat transfer apparatus 20 continues. It is preferred that the liquid used by heat transfer apparatus 20 is water.

As a matter of illustration and reference, FIGS. 2 and 3 illustrate side elevational and end elevational views of generator 21. The side elevational view of generator 21 in FIG. 2 is a left side elevational view showing the opposing upstream and downstream ends 32 and 34 of housing 30, inlet 31 formed at upstream end 32 and outlet 33 formed at downstream end 34. It is to be understood that the opposing right side elevational view of generator 21 is substantially the same as its right side elevational view. The end elevational view of generator 21 in FIG. 3 is the upstream end elevational view of generator 21 showing inlet 31 and heat exchanger 40 disposed therein.

Housing 30 is basically a container or cabinet, and constitutes the supporting structure for the various elements of generator 21 herein previously described. Housing 30 is fashioned from molded polymer material, such as polycarbonate or the like, and is rectangular in shape being formed of attached panels secured to one another, and also to a supporting frame (not shown) with screws, adhesive, rivets, etc. Housing 30 can be formed into other shapes, such as square, oval, etc., and of other materials, including, for instance, 20-guage powder-coated steel lined with ½ inch radiant barrier insulation.

FIG. 4 is a perspective view of generator 21 with portions of housing 30 shown removed for illustrative purposes illustrating air flow pathway 22, impeller 24, portions of liquid delivery system 25, liquid reservoir 26 formed in housing 30 underlying impeller 24, inlet 31 at upstream end 32, outlet 33 and downstream end 34, blower 35 at inlet 31, heat exchangers 40 and 41, and liquid circulation system 42. Heat exchangers 40 and 41 are supported by housing 30 at inlet 31 and outlet 33, respectively, and oppose one another at the respective upstream and downstream ends 32 and 34 of housing 30.

Liquid circulation system 42 couples heat exchangers 40 and 41 in liquid communication with one another, and circulates liquid to and between them. In this embodiment, heat exchanger 40 has an upper end 60 and an opposing lower end 61 (FIG. 5), and heat exchanger 41 has an upper end 62 and an opposing lower end 63. Liquid circulation system 42 includes an upper liquid line or conduit 64 coupling upper ends 60 and 62 of heat exchangers in liquid communication, and a lower liquid line or conduit 65 coupling lower ends 61 and 63 in liquid communication. Lines 64 and 65 each consist of PVC or polyethylene piping plumbed to heat exchangers 40 and 41 in a manner known to the skilled plumber and with the appropriate plumbing fittings and the like.

Figure 5:
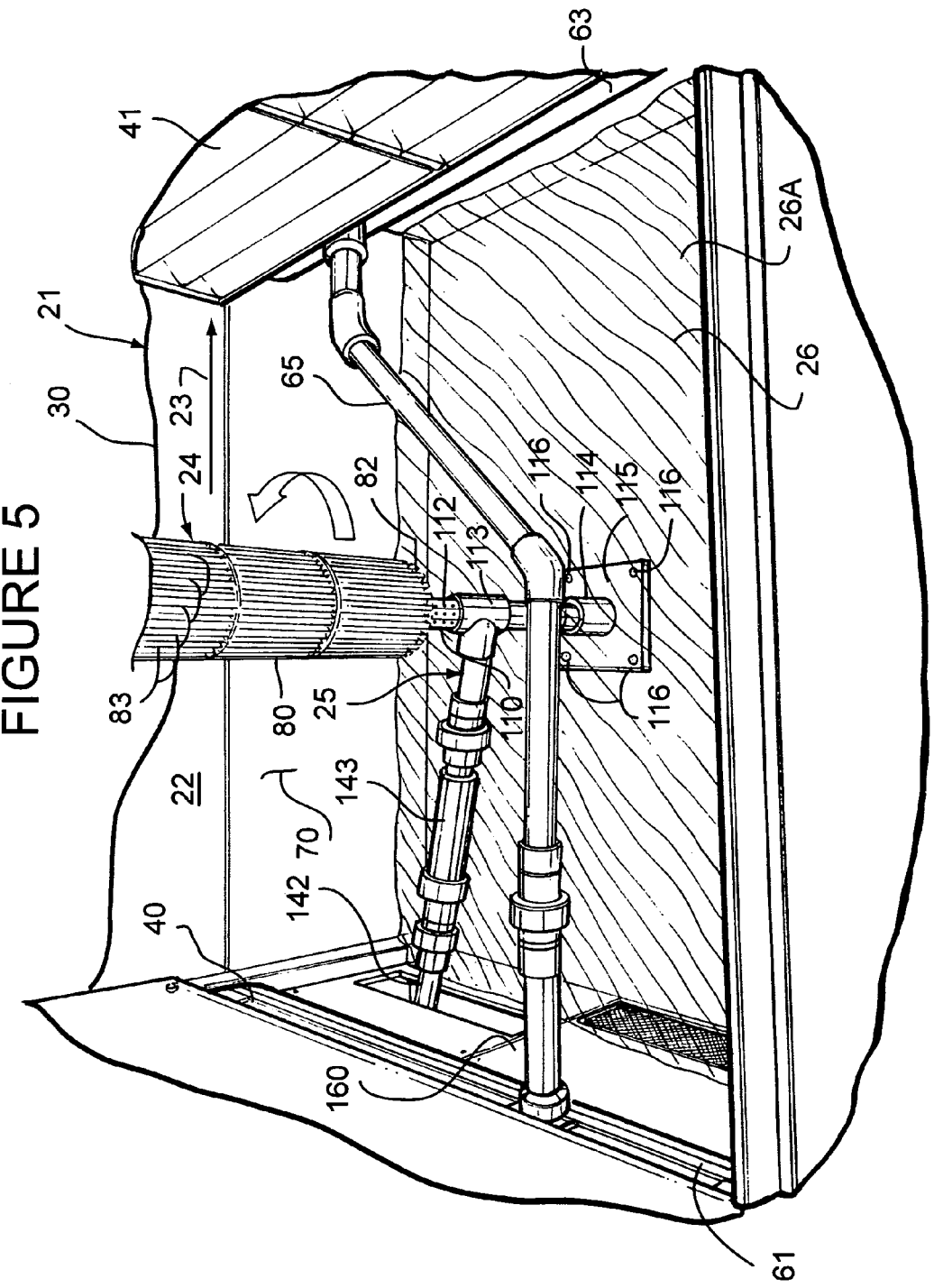
FIG. 5 is a fragmented perspective view of the cold water generator of FIG. 4 illustrating a liquid reservoir associated with the wetting chamber.

As best seen in FIG. 5, a liquid pump 66 is incorporated into conduit 64, which when activated pumps and recirculates liquid through heat exchangers 40 and 41 via conduits 64 and 65. Pump 66 is configured to pump liquid at a flow rate of approximately 10–50 gallons per minute, in which the flow rate chosen will typically depend on the size of the system. Pump 66 is a readily available conventional liquid pump. Although pump 66 is incorporated with conduit 64 in this embodiment, it can alternatively be incorporated with conduit 65, if desired. Also, although only one pump is incorporated with liquid circulation system 42 for recirculating liquid between heat exchangers 40 and 41 via conduits 64 and 65, more can be used, if desired. It is to be understood that when pump 66 is activated pumping and recirculating liquid between heat exchangers 40 and 41 via conduits 64 and 65, that liquid circulation system 42 is considered activated or active.

Impeller 24 is a highly efficient atomizer that receives liquid from liquid delivery system 25 and when rotating converts the liquid into atomized liquid, which it disperses into air flow pathway 22. In this embodiment, impeller 24 is upright and is disposed inside housing 30 and, more particularly, in a wetting chamber 70 of housing, which overlies and is open to liquid reservoir 26. Wetting chamber 70 is the main, interior compartment of housing 30, which bounds and defines at an upper side thereof air flow pathway 22 from inlet 31 to outlet 33, and at an opposing lower side thereof liquid reservoir 26.

As a matter or orientation and reference, housing 30, as best seen in FIGS. 1 and 4, has a roof 71 overlying wetting chamber 70, and a floor 72 underlying wetting chamber 70 forming part of liquid reservoir 26. Impeller 24 disposed at a generally intermediate location in wetting chamber 70 between roof 71 and floor 72, and between inlet 31 and outlet 32 at air flow pathway 22, in accordance with the principle of the invention. Impeller 24 is upright in wetting chamber 70.

Impeller 24 is fashioned of aluminum, titanium, plastic, or other similar corrosion-resistant material or combination of materials, and consists of an elongate body 80 having a proximal end 81 directed toward roof 71, an opposing distal end 82 directed toward floor 72 and liquid reservoir 26. Looking to FIG. 8, impeller 24, which forms part of an impeller assembly of the invention, incorporates a plurality of radial vanes 83 attached to and extending between proximal and distal ends 81 and 82 encircling an interior space 84 of impeller 24, which is referenced in FIG. 9 and extends through elongate body 80 from proximal end 81 to distal end 82. Radial vanes 83 are thin, closely spaced, and are numerous. In an effort to provide vanes 83 with structural support, impeller 24 is formed with a plurality of annular supports 85, which are referenced and best shown in FIG. 8 and are attached to and encircle vanes 83 at equally-spaced intervals between proximal and distal ends 81 and 82.

Referring to FIGS. 1, 4, and 7, a rotary motor 90 is mounted with nut-and-bolt fasteners 89 (FIG. 9) to roof 71, and is located exteriorly of wetting chamber 70. Motor 90 incorporates a drive shaft 91 extending into wetting chamber 70 through an opening 92 formed through roof 71 as seen in FIG. 9. Motor 90 is a conventional rotary motor manufactured for Dayton Electric Mfg. Co. located in Niles, Ill. and offered under the exemplary DAYTON trademark. Other suitable rotary motors can be used without departing from the invention.

Referring to FIG. 9, proximal end 81 of impeller 24 is formed with an annular flange 86 encircling a central opening 87 through proximal end 81. Drive shaft 91 extends into and through opening 87 and through a coupling 100, which is positioned at opening 87 and affixed to annular flange 86. Referring also to FIG. 10, coupling 100 consists three, concentrically arranged components, including an innermost annular sleeve 101, an outermost annular ring 102, and an intermediate annular connector 103 coupling sleeve 101 to ring 102. Sleeve 101 and ring 102 are rigid and are fashioned of aluminum, steel, titanium, or other suitably rigid material or combination of materials, and are preferably integrally formed, such as by way of conventional machining techniques, molding, etc. Looking specifically to FIG. 9, ring 102 is positioned on the underside of annular flange 86 and is affixed thereto with threaded fasteners 104, although it can be affixed in place with nut-and-bolt fasteners, rivets, or the like. Sleeve 101 has opposing upper and lower ends 101A and 101B. Connector 103 is compliant for providing compliance between sleeve 101 and ring 102, in accordance with the principle of the invention. Preferably, connector 103 is fashioned of rubber or other form of elastomeric material and is affixed to upper end 101A of sleeve 101 and to ring 102 with a conventional high-strength adhesive.

With continuing reference to FIG. 9, an elongate foraminous conduit 110 is disposed in, and extends through, interior space 84 of impeller 24 into and through distal end 82 thereof to proximal end 81 thereof, and has an upper or proximal end 111 directed toward proximal end 81 of impeller 24 and, with reference to FIGS. 5, 6, and 8, an opposing lower or distal end 112 extending outwardly from distal end 82 of impeller 24 and which is fitted onto an upper end 113 of a support 114, which depends downwardly therefrom to a lower end of support 114 which is characterized by a base 115 that is positioned on floor 72 of housing 30 and affixed thereto with screws 116 or other form of mechanical fasteners. Radial vanes 83, which together constitute that outer perimeter of impeller 24, encircle foraminous conduit 100 extending through space 84.

Distal end 82 of impeller 24 is formed with an annular flange that encircles a central opening therethrough that encircles foraminous conduit 110. This annular flange of distal end 82 is identical to that of annular flange 86 and its corresponding opening 87, and it is to be understood that the discussion of the structure of annular flange 86 applies equally to the annular flange formed at distal end 82 of impeller 24. Looking to FIG. 8, distal end 82 is fitted with an attached collar 106, which is disposed at the central opening through distal end 82, and which incorporates an annular flange 107 that is secured to the annular flange of distal end 82 with threaded fasteners 108, which are shown in FIG. 11. When collar 106 is attached to distal end 82 of impeller 24, it may be considered part of impeller 24. Foraminous conduit 110 passes into distal end 82 of impeller through collar 106, and FIG. 11 illustrates collar 106 as it would appear encircling foraminous conduit 110. Although threaded fasteners 108 are used to secure annular flange 107 to the corresponding annular flange formed in distal end 82 of impeller 24, other forms of mechanical fasteners can be used, such as nut-and-bolt assemblies, rivets, etc.

Figure 8:
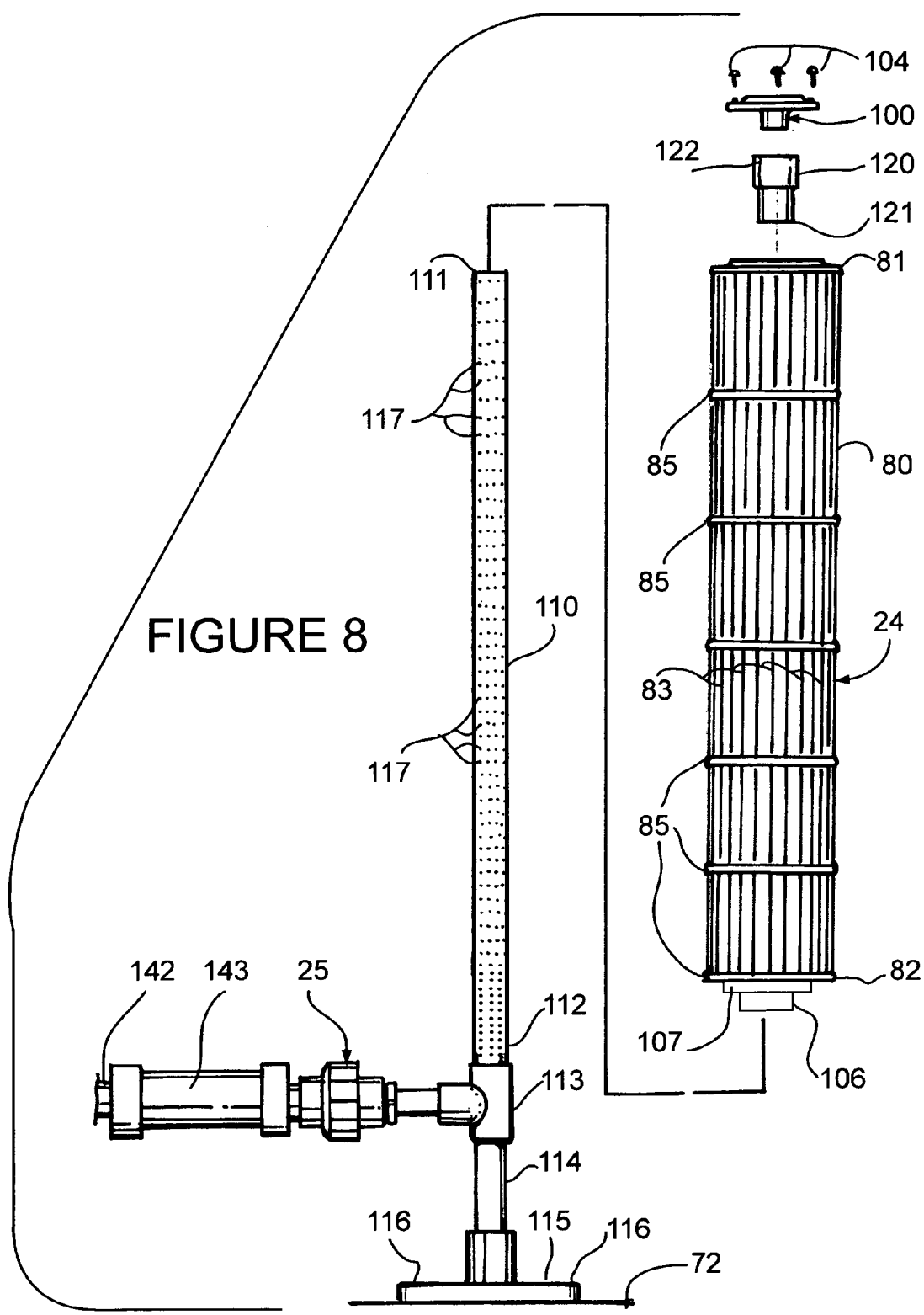
FIG. 8 is an exploded side elevational view of an impeller assembly of the cold liquid generator of FIG. 2.

Foraminous conduit 110 is foraminous, in that it is formed with a vast number of foramina, i.e., small openings, each being designated by the reference character 117, and which are formed along substantially the entire length of foraminous conduit 110 from upper end 111 to lower end 112 as best seen in FIG. 8. Foraminous conduit 110 is a pipe fashioned of PVC, polyethylene, or the like, and is plumbed to liquid deliver system 25. Support 114 supports foraminous conduit 110, which is supported upwardly therefrom into the interior of impeller 24, namely, space 84.

Figure 9:
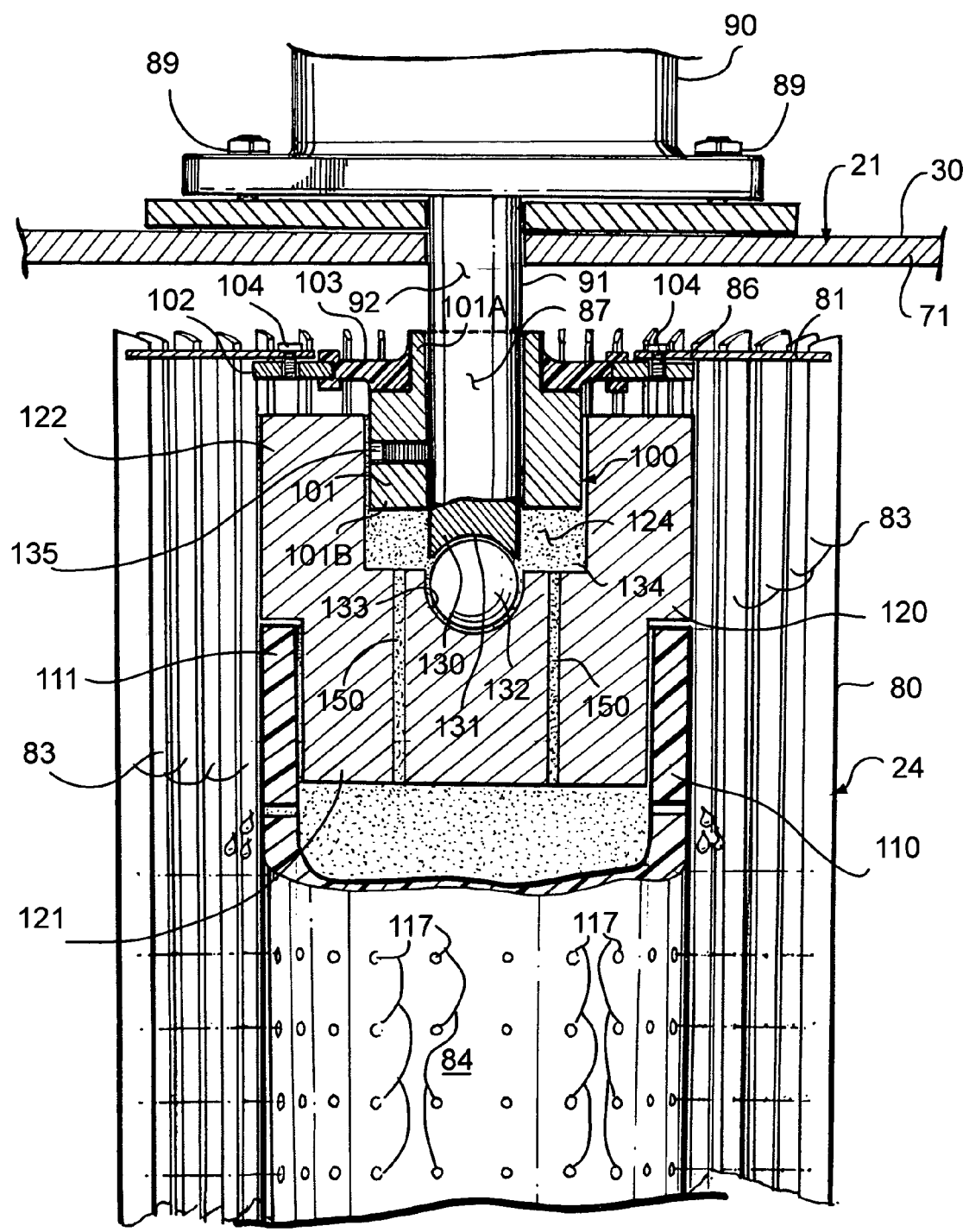
FIG. 9 is a fragmented, vertical sectional view of a driven end of the impeller assembly of FIG. 4.

Looking to FIG. 9, a fixture 120 is provided, which has a lower 121 fitted into upper end 111 of foraminous conduit 110 and an opposing upper end 122 directed toward proximal end 81 of impeller 24. Fixture 120 may be considered part of upper end 111 of foraminous conduit 110, and is preferably rigidly affixed thereto by a press-fit therebetween. Lower end 121 may be affixed to upper end 11 of foraminous conduit 110 with a suitable adhesive, one or more set screws, etc., as it really makes no difference whatsoever so long as lower end 121 is rigidly affixed to upper end 111 of foraminous conduit 110 forming a part thereof. A central recess 124 is formed into upper end 122 of fixture 120, in which lower end 101B of sleeve 101 is positioned.

Drive shaft 91 extends into and through sleeve 101 and terminates outboard of sleeve 101 with a free end 130 in recess 124. Free end 130 formed with a bearing seat 131 positioned atop a ball bearing 132 fitted into a depression 133 formed into blind end 134 of recess 124. Sleeve 101 encircles drive shaft 91, and is rigidly affixed to drive shaft 91 with a set screw 135, which is threadably maintained by sleeve 101 between its upper and lower ends 101A and 101B, and is tightened against drive shaft 91. Shaft 91 can be rigidly affixed to sleeve 101 by press fitting, if desired.

Sleeve 101 can rotate in recess 124 relative to fixture 120, in which coupling 100 rigidly secures drive shaft 91 to impeller 24 suspending impeller 24 in wetting chamber 70. Impeller 24 is free to rotate relative to foraminous conduit 110, including its fixture 120. When rotary motor 90 is activated, it rotates drive shaft 91 at a high rate of speed, which in turn rotates impeller 24 at a high rate of speed. It is to be understood that when rotary motor 90 is activated rotating impeller 24, that the impeller or impeller assembly, as herein described is considered activated or active. The bearing attachment between bearing seat 131 formed in free end 130 of drive shaft 91 and ball bearing 131 situated in depression 133 of fixture 120 permits drive shaft 91 to rotate freely relative fixture 120, and yet registers free end 130 of drive shaft 91 with fixture 120. The compliance offered by connector 103 of coupling 100 provides compliance between drive shaft 91 and impeller 24 taking up and absorbing any imbalance and articulation impeller 24 may experience when it is rotated in response to activation of rotary motor 90.

As previously mentioned, liquid delivery system 25 functions to moving liquid from liquid reservoir 26 to conditioning air heat exchanger 50 and from there to impeller 24, in which impeller 24, when rotating in response to activation of rotary motor 90, rotates creating atomized liquid and dispersing the atomized liquid into air stream 23 passing through air flow pathway 22 between inlet 31 and outlet 33. Referring to FIG. 1, liquid delivery system 25 consists of an outflow line or conduit 140 coupling a pump 141 and conditioning air heat exchanger 50 in liquid communication, and an inflow or return line or conduit 142 coupling conditioning air heat exchanger 50 and impeller 24 in liquid communication. Line 140 consists of PVC or polyethylene piping plumbed to pump 141 and conditioning air heat exchanger 50 in a manner known to the skilled plumber and with the appropriate plumbing fittings and the like. Line 142 consists of PVC or polyethylene piping plumbed to conditioning air heat exchanger 50 and lower end 112 of foraminous conduit 110 at upper end 113 of support 14 in a manner known to the skilled plumber and with the appropriate plumbing fittings and the like. Pump 141 is a conventional fluid pump, that when activated moves liquid from liquid reservoir 26 to conditioning air heat exchanger 50 via line 140, and which is then circulated to foraminous conduit 110 via line 142. Pump 141 is configured to pump liquid at a flow rate of approximately 10–50 gallons per minute, in which the flow rate chosen will typically depend on the size of the system. A conventional and well-known in-line water filter 143 is plumbed in return line 142 as illustrated for filtering any particular matter from the liquid passing therethrough. Although only one filter is incorporated into liquid delivery system 25, more can be used, if desired. Also, although filter 143 is incorporated into line 142, and can be incorporated into line 140, if desired.

It is to be understood that when pump 141 is activated pumping and recirculating liquid between liquid reservoir 26, conditioning air heat exchanger 50, and impeller 24, that liquid delivery system 25 is considered activated or active. Foraminous conduit 110, which may be considered part of liquid delivery system 25, is the mechanism for delivering liquid from line 142 to impeller 24 when liquid delivery system 25 is activated, in which liquid is forced upwardly into foraminous conduit 110 through its lower end 112 filling it, and is forcibly ejected outwardly therefrom through its foramina 117 to vanes 83 of impeller 24 from interior space 84. Because foraminous conduit 110 extends along essentially the entire length of impeller 24 from its distal end 82 to its proximal end 81 as to foramina 117, foraminous conduit 110 disperses liquid to vanes 83 along basically the entire length of impeller 24 from its distal end 82 to its proximal end 81, in accordance with the principle of the invention. When impeller 24 is activated and rotating and liquid delivery system 25 is activated circulating liquid between liquid reservoir 26 and impeller via foraminous conduit 110, liquid is delivered to impeller 24 along basically its entire length from its distal end 82 to its proximal end 81 from interior space 84, in which the interaction of the fluid impacting vanes from within interior space 84 produces a violent atomization of the liquid and dispersion of the atomized liquid through wetting chamber 70 and, therefore, into air stream 23 passing therethrough air flow pathway 22, in accordance with the principle of the invention.

Regarding FIG. 11, collar 106 is shown at its relative position along foraminous conduit 110 when it would be mounted to distal end 82 of impeller 24. Foraminous conduit 110 and collar 106 are arranged such that some of foramina 117 are encircled by collar 106. When liquid is dispersing outwardly from foraminous conduit 110 during operation of the invention, the foramina 117 encircled by collar 106 disperse liquid between collar 106 and foraminous conduit 110 lubricating collar 106 relative to foraminous conduit 110 permitting collar 106 to rotate freely and with reduced friction relative to foraminous conduit 110. A similar form of liquid lubrication is also provided between coupling 100 and fixture 120 as shown in FIG. 9 and, moreover, between coupling 100 and foraminous conduit 110.

As seen in FIG. 9, channels 150 are formed into lower end 121 of fixture 120 and pass to recess 124 thereby coupling upper end 111 of foraminous conduit 110 to recess 124 in liquid communication. When liquid delivery system 25 is activated delivering liquid into and through foraminous conduit 110, liquid from the interior of foraminous conduit 110 is forced into recess 124 via channels 150 lubricating fixture 120 relative to sleeve 101 of coupling 100 and, moreover, upper end 111 of foraminous conduit 110 relative to coupling 100, in which this liquid lubrication permitting collar 100 to rotate freely and with reduced friction relative to fixture 120 and, upper end 111 of foraminous conduit 110. Fixture 120 incorporates two conduits 150, although less or more may be used, if desired.

Figure 6:
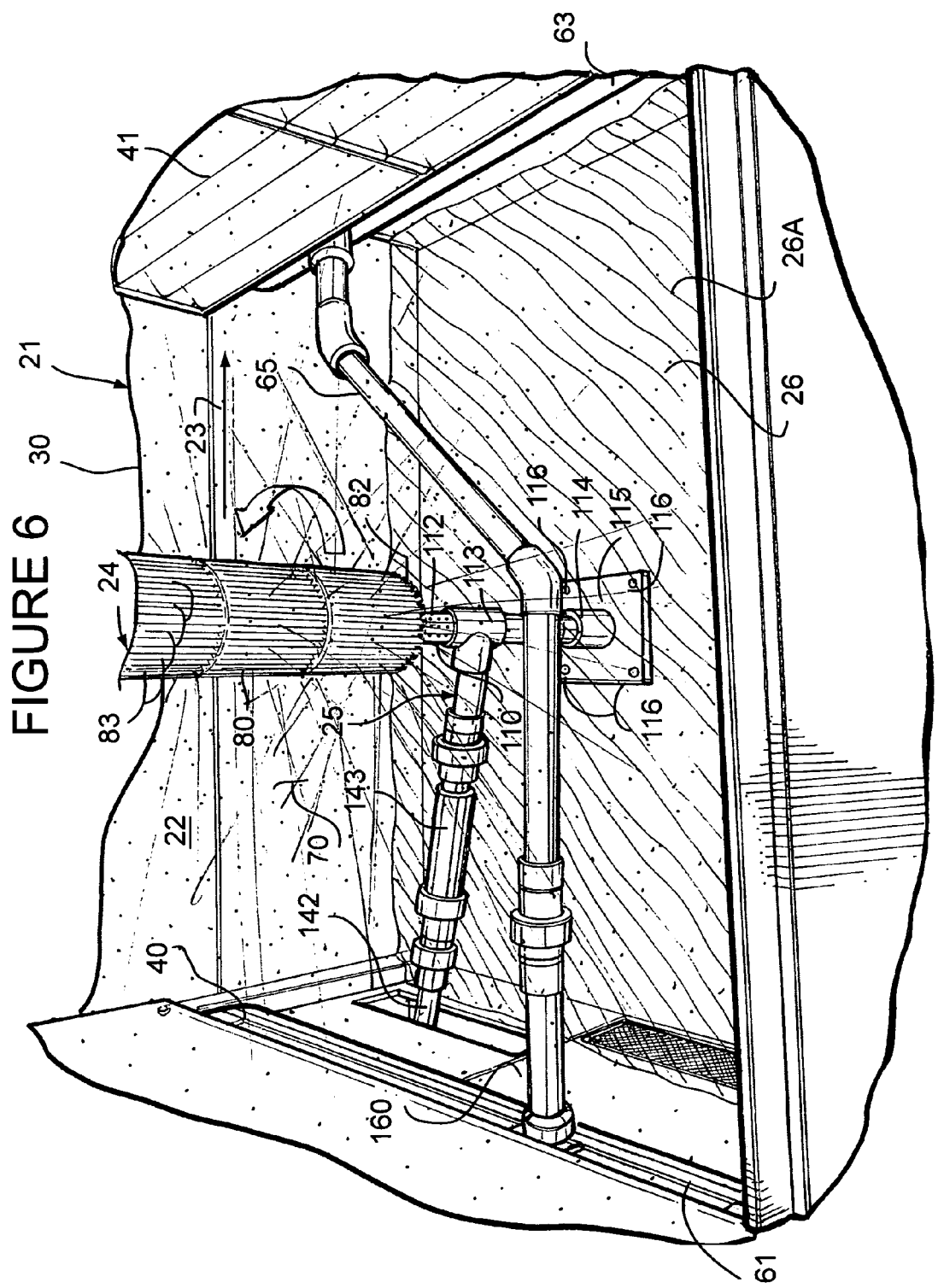
FIG. 6 is a view very similar to the view of FIG. 5 illustrating atomized liquid formed in the wetting chamber produced by rotation of an impeller of the impeller assembly.
Figure 7:
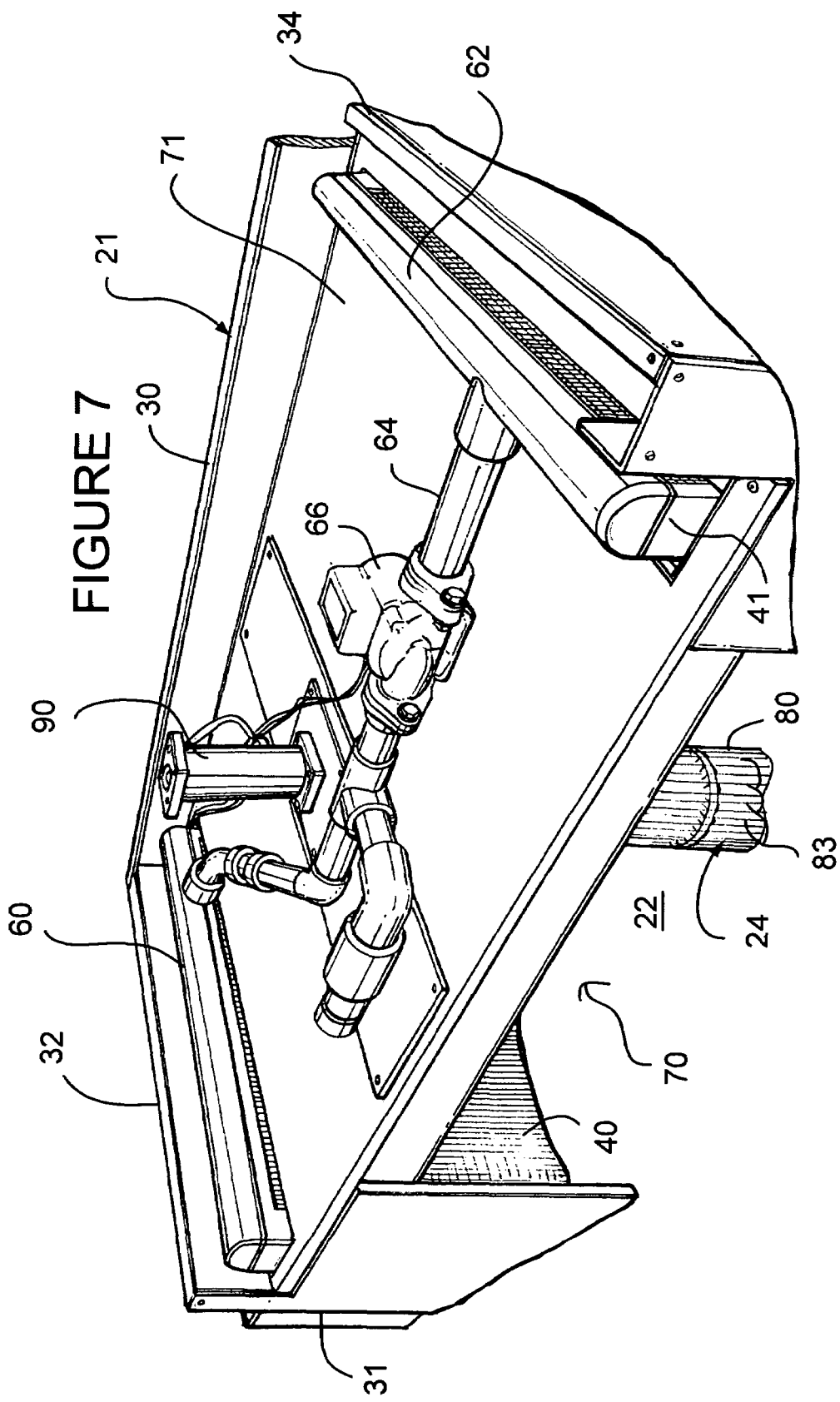
FIG. 7 is a top, fragmented perspective view of the cold water generator of FIG. 4.

As previously mentioned, pump 141 is a conventional fluid pump, that when activated moves liquid from liquid reservoir 26 to conditioning air heat exchanger 50 via line 140, and which is then circulated to foraminous conduit 110 via line 142. Looking to FIGS. 5 and 6, a partition 160 is provided which divides liquid reservoir 26 into a main reservoir region 26A underlying impeller 24 and an auxiliary reservoir region 26B shown in FIG. 12. Pump 141 is mounted at auxiliary reservoir region 26B of reservoir 26, and when activated pumps liquid from auxiliary reservoir region 26B into line 140. Liquid passes through an opening 161 formed in partition 160 from region 26A to region 26B, and a mesh screen 162 is positioned at opening 161 for filtering particular matter from the liquid passing from region 26A to region 26B. FIG. 6 is instructive as it illustrates atomized liquid at it would appear broadcast throughout wetting chamber 70 and into air steam 23 passing along air flow pathway 22 in response to rotation of impeller 24.

Figure 2:
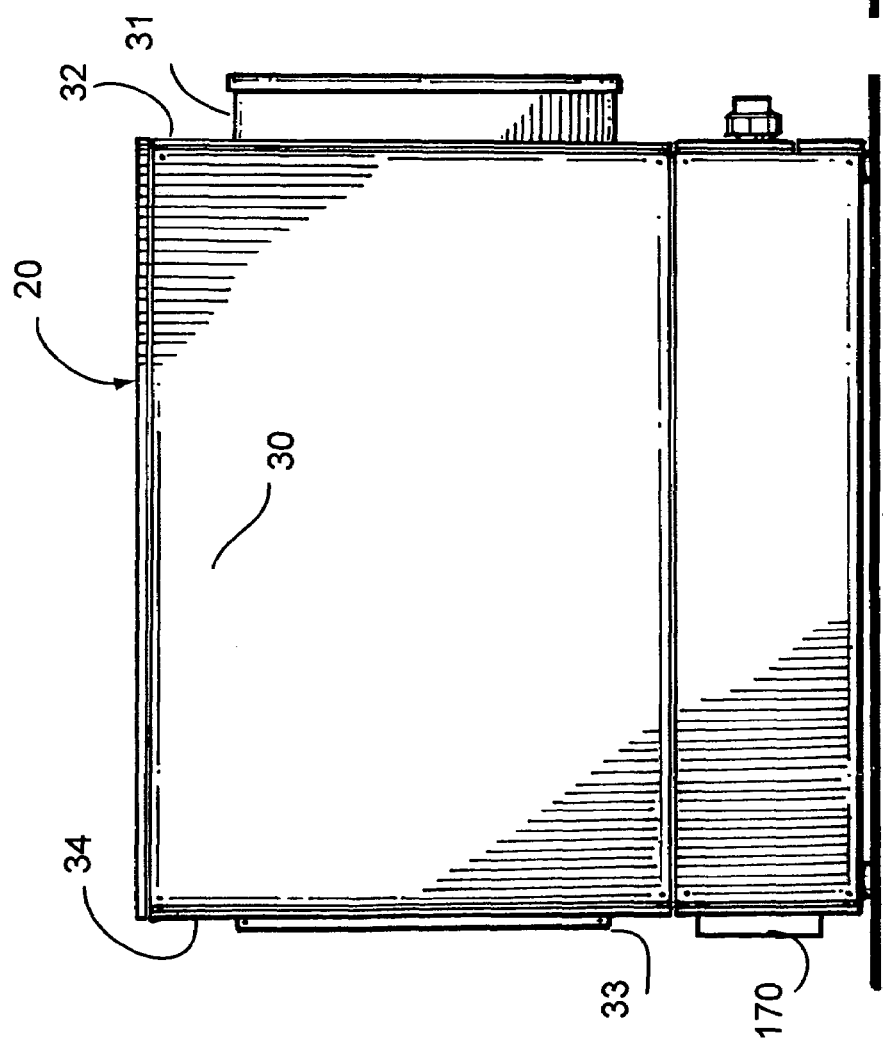
FIG. 2 is a side elevational view of a cold liquid generator of the heat transfer apparatus of FIG. 1.
Figure 13:
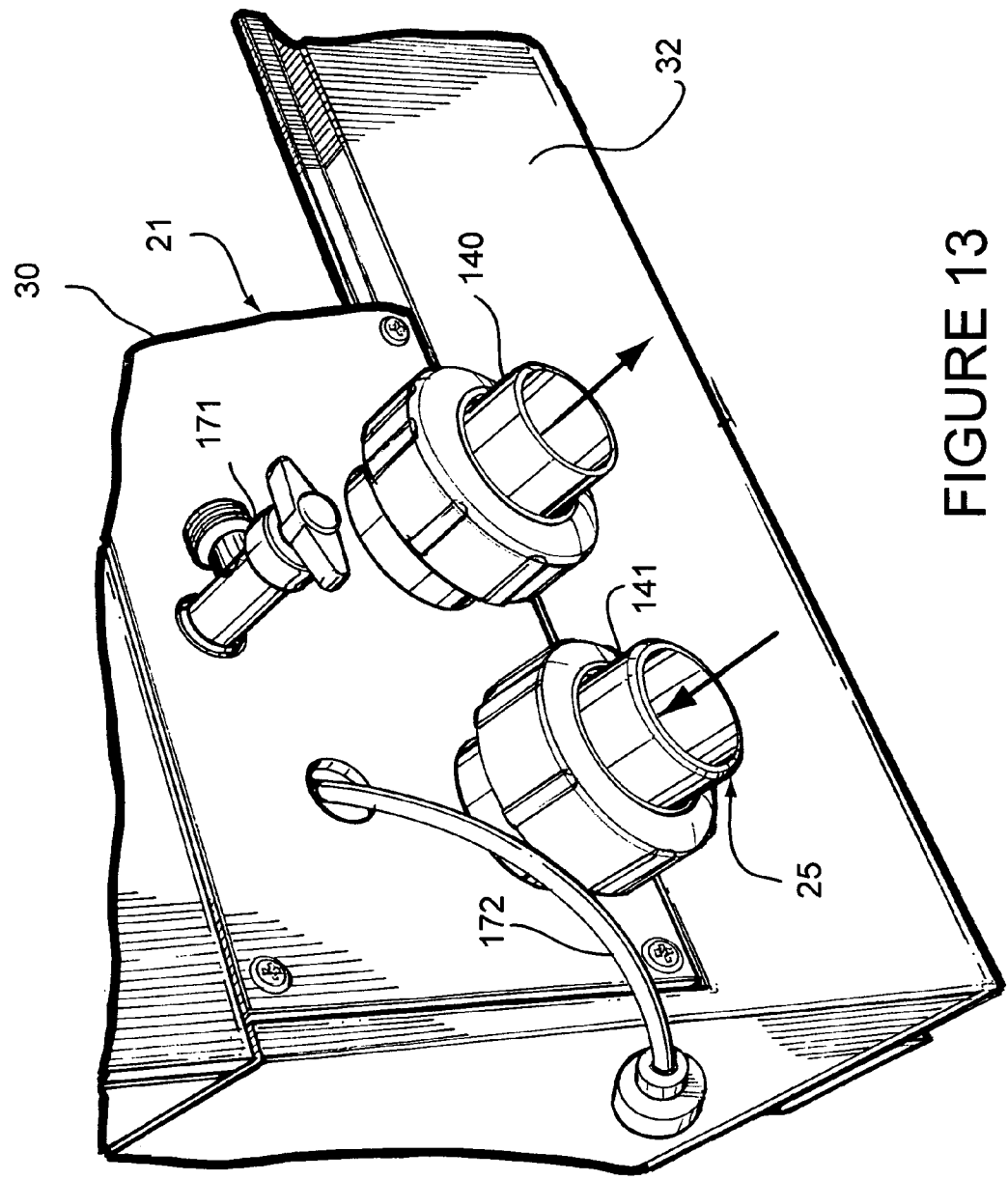
FIG. 13 is a fragmented perspective view of the cold liquid generator of FIG. 4 illustrating outflow and return flow portions of a liquid deliver system of the cold liquid generator.

Looking to FIGS. 1 and 2, there is seen a control panel 170 for housing controls used to operate heat transfer apparatus 20. Preferably, the electrical components of the heat transfer apparatus 20, including generator 21, operate on 90 Volts. Additionally, the controllers (electronic or mechanical) housed in the control panel 170 preferably comprise controls (electronic or mechanical) for the operation of blower 35, pumps 66 and 140, and motor 90. Further, control panel 170 preferably houses at least one multistation timer (electronic or mechanical), preferably two-station timer unit, with a user-adjustable timer function to initiate, at least once a week, an action to evacuate the liquid from liquid reservoir 26, and secondly, to initiate at least one action to add chemicals (i.e., surfactant, etc.) as necessary. Looking to FIG. 13, generator 21 preferably incorporates an evacuation valve 171 at upstream end 31 of housing 30 used to evacuate liquid from liquid reservoir 26, whether manually or by the operation of control panel 170, and a supply line 172 for replenishing liquid reservoir 26 with replenishing liquid and also any needed chemicals.

The invention has been described above with reference to a preferred embodiment. However, those skilled in the art will recognize that changes and modifications may be made to the embodiment without departing from the nature and scope of the invention. For instance, various elements of the invention, including liquid delivery system 25, liquid circulation system 42, the heat exchangers of the cold water generator, and the conditioning air heat exchanger, can be multiplied as desired for meeting specific needs and for scaling the heat transfer apparatus to a particular scale. Also, liquid reservoir 26 can be configured with a makeup liquid system incorporating a float valve and a liquid supply line for automatically replenishing liquid reservoir 26 when the liquid maintained therein falls below a predetermined level. Make up liquid systems that may be used with the invention are notoriously well known in the art. Also, the direction of air flow through housing from inlet 31 to outlet 33 can be reversed, if desired, in which the invention will work equally as well. Also, drift eliminators may be incorporated with heat exchangers 40 and 41, if desired.

Figure 15:
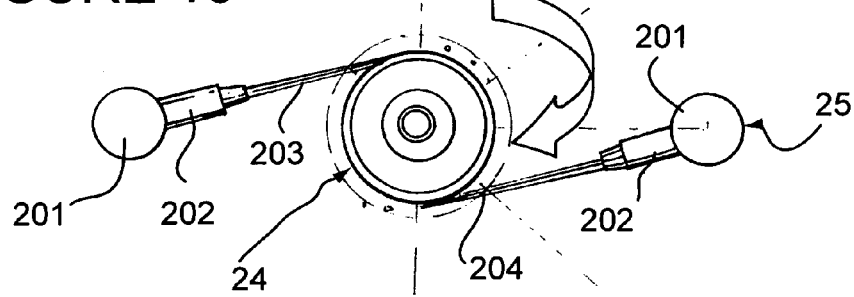
FIG. 15 is a top diagrammatic view of an impeller and portions of a liquid delivery system of the cold liquid generator of FIG. 15.
Figure 14:
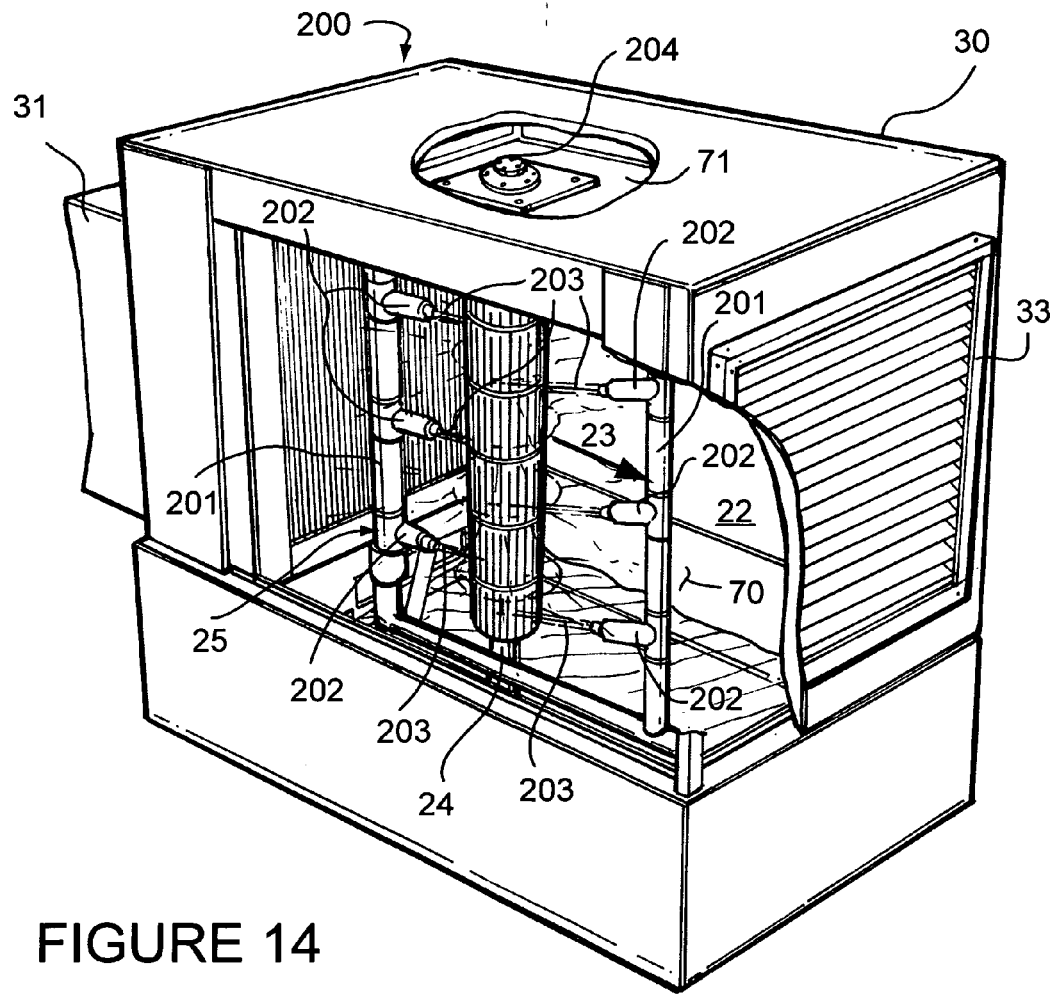
FIG. 14 is a perspective view of an alternate embodiment of a cold liquid generator constructed and arranged in accordance with the principle of the invention, with portions thereof broken away for illustrative purposes.

FIG. 14 illustrates an alternate embodiment of a cold liquid generator denoted generally at 200, which is identical in every respect to cold water generator 21 including, as a matter of reference, housing 30, inlet 31, outlet 33, air flow pathway 22 in wetting chamber 70, liquid delivery system 25, and impeller 24. Rather than introducing liquid to impeller 24 from within it as is the case with generator 21, liquid delivery system 25 of generator 200 incorporates opposed upstanding delivery conduits 201 in wetting chamber 70 on either side of impeller 24, which are configured with nozzles 202 that direct streams 203 of liquid at impeller 24 when liquid deliver system 25 is activated. Also, rather than using a rotary motor to impart rotation to impeller 24 as discussed in conjunction with the embodiment designated at 21 previously discussed, streams 203 are directed at opposing sides of impeller 24 as best shown in FIG. 15, which, in response thereto, forcibly rotates impeller 24, in accordance with this alternate embodiment. And so in response to being hit by streams 203 of liquid, impeller 24 is made to rotate, in which streams 203 of liquid are deflected from the rotating impeller 24 in the form of atomized liquid, which is dispersed into air flow pathway 22 and, of course, into air stream 23 passing therethrough from inlet 31 to outlet 32.

It is to be understood in this embodiment designated at 200 that the impeller assembly of generator 200 is identical in every respect to the impeller assembly of generator 21, except that the conduit extending through its interior is not a foraminous conduit and is not plumped to liquid delivery system 25. Also, although there is no motor for imparting rotation to impeller 24 of generator 200, it can be mounted for rotation in the same way, or with a conventional rotating bearing 204 mounted to roof 71.

Although generator 200 incorporates two delivery conduits 201, it can incorporate less or more. Also, although delivery conduits 201 each incorporate three nozzles 202, each for producing a stream of liquid, delivery conduits 201 can each incorporate less or more, if desired.

Other changes can also be made. For instance, in FIG. 1 liquid delivery system 25 is shown as it would appear incorporating an auxiliary supply line 210 for use in replenishing liquid directly in line 25. In FIG. 1, liquid circulation system 42 is shown as it would appear incorporating a take up line 220 and a drain line 221. In this embodiment, drain line 220 is formed in conduit 64, and take up line 221 is formed in conduit 65. Although liquid delivery system 42 has been disclosed as a closed circulation system in the preferred embodiment, lines 220 and 221 can be provided in an alternate embodiment for making liquid circulation system 42 an open system.

In this alternate embodiment, take up line 221 extends into the liquid held by liquid reservoir 26, and drain line 220 is directed downwardly through roof 71 toward impeller 24. When pump 66 activates, liquid from liquid reservoir 26 is drawn into conduit 65 and circulated through, and filling, heat exchangers 40 and 41 via liquid circulation system 42. When pump 66 deactivates, liquid in conduit 64 drains outwardly through drain line 220 to be collected by liquid reservoir, and liquid in heat exchangers 40 and 41 and conduit 65 drains therefrom through take up line 221 into liquid reservoir 26, in which air is able to pass into conduit 64 through drain line 220 to permit liquid to drain through take up line 221. This draining of heat exchangers 40 and 41 and conduits 64 and 65 by lines 220 and 221 prevents liquid from sitting in heat exchangers 40 and 41 and conduits 64 and 65 during periods of nonuse.

In yet another example, FIG. 5 shows a conduit 230 coupling liquid delivery system 25 to liquid circulation system 42, and, more particularly, conduit 65 of liquid transfer system 42. In this example, liquid from liquid delivery system 25 supplies liquid to liquid circulation system 42, in which liquid is pulled into conduit 65 from liquid delivery system 25 when liquid circulation system 42 is activated.

Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. Apparatus, comprising:
   a wetting chamber;
   an air intake opening leading to an air flow pathway through the wetting chamber;
   an air outtake opening leading from the air flow pathway through the wetting chamber;
   an atomizer;
   a liquid reservoir;
   a liquid delivery system for moving liquid from the liquid reservoir to the atomizer;
   the atomizer for receiving the liquid from the liquid delivery system and dispersing the liquid into the air flow pathway in a form of atomized liquid;
   the liquid reservoir disposed for collecting the atomized liquid from the wetting chamber;
   a first heat exchanger disposed at the intake opening;
   a second heat exchanger disposed at the outtake opening; and
   a liquid circulation system for circulating liquid between the first and second heat exchangers;
   wherein the atomizer comprises:
   an impeller, mounted for rotation, disposed in the wetting chamber and arranged to receive liquid from the liquid delivery system; and
   means for imparting rotation to the impeller;
   whereby rotation of the impeller produces the atomized liquid from the liquid received by the impeller from the liquid delivery system, and disperses the atomized liquid into the air flow pathway.

2. Apparatus according to claim 1, further comprising blower apparatus for forcing air through the air flow pathway from the intake opening to the outtake opening.

3. Apparatus according to claim 1, further comprising a conditioning air heat exchanger, disposed in a conditioning air flow pathway between a conditioning air intake opening and a conditioning air outtake opening, coupled to the liquid delivery system between the liquid reservoir and the atomizer.

4. Apparatus according to claim 1, further comprising conditioning air blower apparatus for forcing conditioning air through the conditioning air flow pathway from the conditioning air intake opening to the conditioning air outtake opening.

5. Apparatus according to claim 1, wherein the means for imparting rotation to the impeller comprises at least one stream of liquid directed at the impeller from the liquid delivery system.

6. Apparatus according to claim 1, wherein the means for imparting rotation to the impeller comprises a motor coupled to the impeller.

7. Apparatus according to claim 1, further comprising:
   the impeller comprising an elongate body having a proximal end, a distal end, and a plurality of radial vanes attached to and extending between the opposing proximal and distal ends encircling an interior space of the impeller;
   the liquid delivery system including an elongate foraminous conduit disposed in the interior space for dispersing liquid to the radial vanes of the impeller from the interior space thereof.

8. Apparatus according to claim 7, wherein the impeller is further mounted for rotation relative to the elongate foraminous conduit.

9. Apparatus according to claim 8, further comprising:
   a collar, encircling the elongate foraminous conduit, attached to the distal end of the impeller; and
   the elongate foraminous conduit arranged to introduce liquid therefrom between the collar and the elongate foraminous conduit lubricating the collar relative to the elongate foraminous conduit.

10. Apparatus according to claim 8, further comprising:
    a coupling, mounted for rotation, attached to the proximal end of the impeller; and
    the elongate foraminous conduit arranged to introduce liquid therefrom between the coupling and the elongate foraminous conduit lubricating the coupling relative to the elongate foraminous conduit.

11. Apparatus, comprising:
    a wetting chamber;
    an air intake opening leading to an air flow pathway through the wetting chamber;
    an air outtake opening leading from the air flow pathway through the wetting chamber;
    an impeller, mounted for rotation, disposed in the wetting chamber;
    a liquid reservoir;
    a liquid delivery system for moving liquid from the liquid reservoir to the impeller;
    means for imparting rotation to the impeller, whereby rotation of the impeller produces atomized liquid from the liquid received by the impeller from the liquid delivery system, and disperses the atomized liquid into the air flow pathway; and
    the liquid reservoir disposed for collecting the atomized liquid from the wetting chamber.

12. Apparatus according to claim 11, further comprising:
    a first heat exchanger disposed at the intake opening;
    a second heat exchanger disposed at the outtake opening;
    a liquid circulation system for circulating liquid between the first and second heat exchangers.

13. Apparatus according to claim 11, further comprising blower apparatus for forcing air through the air flow pathway from the intake opening to the outtake opening.

14. Apparatus according to claim 11, further comprising a conditioning air heat exchanger, disposed in a conditioning air flow pathway between a conditioning air intake opening and a conditioning air outtake opening, coupled to the liquid delivery system between the liquid reservoir and the atomizer.

15. Apparatus according to claim 11, further comprising conditioning air blower apparatus for forcing conditioning air through the conditioning air flow pathway from the conditioning air intake opening to the conditioning air outtake opening.

16. Apparatus according to claim 11, wherein the means for imparting rotation to the impeller comprises at least one stream of liquid directed at the impeller from the liquid delivery system.

17. Apparatus according to claim 11, wherein the means for imparting rotation to the impeller comprises a motor coupled to the impeller.

18. Apparatus according to claim 11, further comprising:
the impeller comprising an elongate body having a proximal end, a distal end, and a plurality of radial vanes attached to and extending between the opposing proximal and distal ends encircling an interior space of the impeller;
the liquid delivery system including an elongate foraminous conduit disposed in the interior space for dispersing liquid to the radial vanes of the impeller from the interior space thereof.

19. Apparatus according to claim 18, wherein the impeller is further mounted for rotation relative to the elongate foraminous conduit.

20. Apparatus according to claim 19, further comprising:

a collar, encircling the elongate foraminous conduit, attached to the distal end of the impeller; and the elongate foraminous conduit arranged to introduce liquid therefrom between the collar and the elongate foraminous conduit lubricating the collar relative to the elongate foraminous conduit.

21. Apparatus according to claim 19, further comprising:

a coupling, mounted for rotation, attached to the proximal end of the impeller; and the elongate foraminous conduit arranged to introduce liquid therefrom between the coupling and the elongate foraminous conduit lubricating the coupling relative to the elongate foraminous conduit.

22. Apparatus, comprising:
an air flow pathway;
an artificially-produced air stream passing through the air flow pathway;
a rotating impeller disposed adjacent the air flow pathway;
a liquid delivery system delivering liquid from a source of liquid to the rotating impeller thereby producing atomized liquid and dispersing the atomized liquid into the artificially-produced air stream;
a liquid reservoir collecting the atomized liquid;
a first heat exchanger in the air stream upstream of the rotating impeller;

a second heat exchanger in the air stream downstream of the rotating impeller; and a liquid circulation circulating liquid between the first and second heat exchangers.

23. Apparatus according to claim 22, further comprising blower producing the air stream through the air flow pathway.

24. Apparatus according to claim 22, further comprising:

the liquid reservoir comprising a source of liquid for the liquid delivery system;

a conditioning air heat exchanger, disposed in a conditioning air flow pathway between a conditioning air intake opening and a conditioning air outtake opening, coupled to the liquid delivery system between the liquid reservoir and the rotating impeller.

25. Apparatus according to claim 24, further comprising conditioning air blower apparatus forcing conditioning air through the conditioning air flow pathway from the conditioning air intake opening to the conditioning air outtake opening.

26. Apparatus according to claim 22, further comprising:

the impeller comprising an elongate body having a proximal end, a distal end, and a plurality of radial vanes attached to and extending between the opposing proximal and distal ends encircling an interior space of the impeller;

the liquid delivery system including an elongate foraminous conduit disposed in the interior space dispersing liquid to the radial vanes of the impeller from the interior space thereof.

* * * * *